United States Patent Office 3,117,118
Patented Jan. 7, 1964

3,117,118
NEW AZO DYESTUFFS
Peter William Barker, Manchester, England, assignor to Imperial Chemical Industries Limited, London, England, a corporation of Great Britain
No Drawing. Filed Nov. 18, 1960, Ser. No. 70,111
Claims priority, application Great Britain Dec. 3, 1959
6 Claims. (Cl. 260—207.1)

This invention relates to new monoazo dyestuffs and more particularly it relates to new monoazo dyestuffs suitable for the dyeing of synthetic fibres.

According to the invention we provide new monoazo dyestuffs of the formula

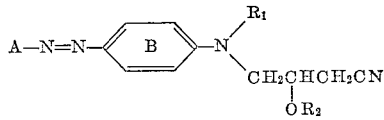

wherein A stands for a mono- or bi-cyclic aryl radical free from sulphonic or carboxylic acid groups, $R_1$ stands for an alkyl radical of from 1 to 4 carbon atoms, which may carry substituents other than sulphonic and carboxylic acid groups, or for the group

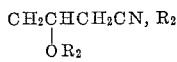

stands for hydrogen or an alkoyl radical of from 1 to 4 carbon atoms or an aroyl radical, and the benzene nucleus B may carry substituents other than sulphonic and carboxylic acid groups.

As examples of mono- or bi-cyclic aryl radicals which may be represented by A there may be mentioned carbocyclic radicals, for example phenyl, α-naphthyl, and β-naphthyl, and heterocyclic radicals, for example thiazol-2-yl and benzthiazol-2-yl. Such radicals may carry substituents, especially negative substituents, for example nitro, cyano, thiocyano, carbalkoxy such as carbomethoxy, alkylsulphonyl such as methylsulyphonyl and halogeno such as chloro and bromo.

As examples of alkyl groups and substituted alkyl groups which may be represented by $R_1$ there may be mentioned methyl, ethyl, butyl, β-hydroxyethyl, β-acetoxyethyl and β-methoxyethyl.

As examples of alkoyl or aroyl radicals which may be represented by $R_2$ there may be mentioned acetyl, propionyl, butyryl, benzoyl, p-toluyl and p-methoxybenzoyl.

As examples of substituents which may be carried by the benzene nucleus B there may be mentioned methyl, halogeno such as chloro and bromo, alkoxy such as methoxy and ethoxy, and acylamido such as acetamido.

According to a further feature of our invention we provide a process for the manufacture of new monoazo dyestuffs as hereinbefore defined which comprises coupling a diazotised amine of the formula A—NH$_2$ with a coupling component of the formula

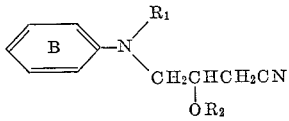

wherein A, B, $R_1$ and $R_2$ have the meanings previously state.

This process may conveniently be carried out by adding an aqueous solution of the diazotised amine to a solution of the coupling component in a mixture of dilute hydrochloric acid and a water-miscible organic solvent which is inert under the reaction conditions, for example acetone, adding a mildly alkaline reagent such as sodium acetate to raise the pH of the mixture, and stirring until coupling is complete. The monoazo dyestuff which is precipitated may then conveniently be filtered off, neutralised with a dilute alkali such as sodium carbonate solution, re-filtered washed with water and dried.

As examples of amines of the formula A—NH$_2$ which may be used in the process of the invention there may be mentioned aniline, p-toluidine, p-nitroaniline, 2-chloro-4-nitroaniline, 2-chloro-4-cyanoaniline, 4-nitro-2-cyanoaniline, α-naphthylamine, β-naphthylamine, 5-nitro-2-aminothiazole, 2-aminobenzthiazole, 6-thiocyano-2-aminobenzthiazole, 6 - cyano - 2 - aminobenzthiazole, 6 - methanesulphonyl-2-aminobenzthiazole, and methyl 2-amino-5-nitrobenzoate.

As examples of coupling components which may be used in the process of the invention there may be mentioned N - methyl - N - (γ - cyano - β - hydroxypropyl)-aniline, N - ethyl - N - (γ - cyano - β - hydroxypropyl)aniline, N - β - hydroxyethyl - N - (γ - cyano - β - hydroxypropyl)aniline, N - methyl - N - (γ - cyano - β - hydroxypropyl) - m - toluidine, N - methyl - N - (γ - cyano - β-hydroxypropyl)-m-anisidine, N-methyl-N-(γ-cyano-β-hydroxypropyl) - m - aminoacetanilide, N - methyl - N - (γ-cyano - β - acetoxypropyl)aniline, N - methyl - N - (γ-cyano - β - acetoxypropyl) - m - toluidine, N - methyl-N - (γ - cyano - β - propionoxypropyl)aniline, N - methyl-N - (γ - cyano - β - benzoyloxypropyl)aniline, N - β-acetoxyethyl - N - (γ - cyano - β - acetoxypropyl) - m-toluidine and N - n - butyl - N - (γ - cyano - β - acetoxyproplyl)-m-toluidine.

Those coupling components in which $R_2$ stands for hydrogen may be obtained by reaction of the appropriate N-(γ-chloro-β-hydroxypropyl) compound with sodium cyanide, for example by stirring with an aqueous solution at 50° C. for 30 minutes. The product may conveniently be isolated by pouring the reaction mixture into a large volume of water and extracting the oil with benzene. After drying, and evaporating of the benzene the product may then be distilled under reduced pressure.

Those coupling components in which $R_2$ stands for an alkoyl or an aroyl radical may be obtained by acylation of the corresponding coupling components in which $R_2$ stands for hydrogen, for example by treatment with the appropriate acid anhydride or chloride, if desired in the presence of a basic solvent such as pyridine. After completion of the reaction the product may be isolated by pouring the reaction mixture into water, extracting the oil with benzene, drying, evaporating off the solvent and distilling under reduced pressure.

According to yet a further feature of the invention we provide an alternative process for the manufacture of those monoazo dyestuffs as hereinbefore defined wherein $R_2$ stands for an alkoyl radical of from 1 to 4 carbon atoms or an aroyl radical, which comprises treating a monoazo dyestuff as hereinbefore defined wherein $R_2$ stands for hydrogen with an anhydride or acid halide an alkyl carboxylic acid of from 1 to 4 carbon atoms or of an aryl carboxylic acid.

This process may conveniently be carried out by heating a mixture of the monoazo dyestuff wherein $R_2$ stands for hydrogen with the appropriate anhydride or acid chloride in a basic solvent such as pyridine, for example for 2 hours at between 50° C. and 100° C. When the reaction is completed the reaction mixture may be poured into water and the precipitated dyestuff filtered off, washed and dried.

The new water-insoluble monoazo dyestuffs, as hereinbefore defined, are valuable for dyeing textile materials comprising artificial fibres, for example cellulose ester fibres such as cellulose acetate rayon and cellulose triacetate rayon, polyamide fibres such as fibres from polyhexamethylene adipamide and polycaprolactam, polyvinyl fibres such as polyacrylonitrile fibres and modified polyacrylonitrile fibres, and especially aromatic polyester fibres such as polyethylene terephthalate fibres. For dyeing such textile materials it is preferred to use the new monoazo dyestuffs in a finely divided form such as may be obtained by milling the dyestuffs with water in the presence of a dispersing agent, for example disodium dinaphthylmethane di-$\beta$-suphonate. If desired the dispersed aqueous paste obtained in this way may be dried to form a re-dispersible powder which may be obtained in a non-dusting form by any of the processes known for forming non-dusting powders.

The new monazo dyestuffs as hereinbefore defined have excellent affinity for textile materials comprising polyester fibres, which they dye in orange to violet shades possessing good fastness to dry heat treatments and to light.

Those new monoazo dyestuffs as hereinbefore defined wherein $R_2$ stands for an alkoyl radical of from 1 to 4 carbon atoms or an aroyl radical form a preferred feature of our invention since they dye textile materials comprising polyester fibres in shades having excellent fastness to dry heat treatments and to light, and those dyestuffs wherein $R_2$ stands for an acetyl radical are especially preferred because they may readily be manufactured from intermediates which are available in the chemical industry.

The invention is illustrated but not limited by the following examples in which the parts are by weight.

*Example 1*

19.6 parts of methyl 2-amino-5-nitrobenzoate are dissolved in 200 parts of glacial acetic acid by warming to 40° C., then 30 parts of a 10 N aqueous solution of hydrochloric acid are added and the solution is cooled to 5° C. The fine suspension obtained in this way is diazotised by adding an aqueous solution of 6.9 parts of sodium nitrite in 50 parts of water, the temperature being maintained at between 5° and 10° C. After 15 minutes the solution is filtered and the diazo solution is added with stirring at between 5° and 10° C. to a solution of 19 parts of N-methyl-N-($\gamma$-cyano-$\beta$-hydroxypropyl)aniline in a mixture of 1000 parts of water, 50 parts of a 2 N aqueous solution of hydrochloric acid and 150 parts of acetone. 75 parts of a 4 N aqueous solution of sodium acetate are then added and the mixture stirred for a further 2 hours, and the precipitated dyestuff is then filtered off. The dyestuff paste is stirred in 1000 parts of water and sodium carbonate is added until the mixture is neutral to litmus. The dyestuff is then re-filtered, washed with water and dried. 4-nitro-2-carbomethoxy-4'-[N-methyl-N-($\gamma$-cyano-$\beta$-hydroxypropyl)amino]azobenzene is obtained as a red powder. When dispersed in water by milling with disodium dinaphthylmethane-di-$\gamma$-sulphonate this product dyes textile materials comprising polyester fibres in red shades possessing good fastness to dry heat treatments and to light.

The N-methyl-N-($\gamma$-cyano-$\beta$-hydroxypropyl)aniline used in this example may be obtained by adding a solution of 21.6 parts of sodium cyanide in 50 parts of water to a solution of 80 parts of N-methyl-N($\gamma$-chloro-$\beta$-hydroxypropyl)aniline (Journal of the Chemical Society, 1950, page 890 in 80 parts of alcohol during 30 minutes, with stirring at 50° C. The mixture is stirred for a further 3 hours, then poured into 1000 parts of water and the oil which separates is extracted with benzene. The benzene solution is separated off, dried with anhydrous sodium sulphate and the benzene evaporated. The residue is distilled under reduced pressure, the fraction boiling between 142° and 145° C. at a pressure of 0.13 millimetre of mercury being collected.

*Example 2*

In place of the 19.6 parts of methyl 2-amino-5-nitrobenzoate used in Example 1 there are used 15.25 parts of 2-chloro-4-cyanoaniline. The 2-chloro-4-cyano-4'-[N - methyl - N-($\gamma$-cyano-$\beta$-hydroxypropyl)amino]azobenzene so obtained when dispersed in aqueous medium by milling with disodium dinaphthylmethane-di-$\beta$-sulphonate dyes textile materials comprising polyester fibres in orange shades of good fastness to dry heat treatments and to light.

*Example 3*

7.25 parts of sodium nitrite are added, with stirring, to 60 parts of sulphuric acid of 100% strength at between 20° and 27° C. during 30 minutes and the solution so obtained is stirred for a further 30 minutes. The solution is then added with stirring to a suspension of 20.7 parts of 2-amino-6-thiocyanobenzthiazole in 105 parts of an 85% aqueous solution of sulphuric acid at a temperature of —3° C. 150 parts of water are then added, keeping the temperature below 10° C. and the mixture is stirred at 0° C. for 5 minutes. The diazo solution so obtained is then added at between 5° and 10° C. with stirring to a solution of 19 parts of N-methyl-N-($\gamma$-cyano-$\beta$-hydroxypropyl)aniline in a mixture of 1000 parts of water, 50 parts of a 2 N aqueous solution of hydrochloric acid and 150 parts of acetone. 250 parts of a 10 N aqueous solution of sodium hydroxide are then added, the mixture stirred for 30 minutes and the precipitated dyestuff is filtered off. The dyestuff paste is stirred with 1000 parts of water, sodium carbonate is added until the mixture is neutral to litmus and the dyestuff is then refiltered, washed with water and dried. The 4(6'-thiocyanobenzthiaz - 2'-ylazo)-N-methyl-N-($\gamma$-cyano-$\beta$-hydroxypropyl)-aniline so obtained, when dispersed in water by milling with disodium dinaphthylmethane di-$\beta$-sulphonate dyes textile materials comprising polyester fibres in red shades possessing good fastness to dry heat treatments.

*Example 4*

17.25 parts of 2-chloro-4-nitroaniline are dissolved in 125 parts of glacial acetic acid by warming to 40° C., 30 parts of a 10 N aqueous solution of hydrochloric acid are added and the solution is cooled to 5° C. The fine suspension obtained in this way is diazotised by adding an aqueous solution of 6.9 parts of sodium nitrite in 50 parts of water, the temperature being maintained at between 5° and 10° C. After 15 minutes the diazo solution is filtered and is then added with stirring at between 5° and 10° C. to a solution of 23.2 parts of N-methyl-N-($\gamma$-cyano-$\beta$-acetoxypropyl)aniline in a mixture of 1000 parts of water, 50 parts of a 2 N aqueous solution of hydrochloric acid and 800 parts of acetone. 75 parts of a 4 N aqueous solution of sodium acetate are then added and after stirring for 3 hours at atmospheric temperature the dye which is precipitated is filtered off. The dye paste is stirred in 1000 parts of water and sodium carbonate is added until the mixture is neutral to litmus. The dyestuff is filtered off, washed with water and dried. When the 2-chloro-4-nitro-4'-[N-methyl-N-($\gamma$-cyano-$\beta$-acetoxypropyl)amino]azobenzene so obtained is dispersed in aqueous medium it dyes textile materials comprising polyester fibres in scarlet shades possessing very good fastness to dry heat treatments and to light.

The N-methyl-N-($\gamma$-cyano-$\beta$-acetoxypropyl)aniline used in this example may be obtained by warming on the steam bath a mixture of 35.4 parts of N-methyl-N-($\gamma$-cyano-$\beta$-hydroxypropyl)aniline and 51.5 parts of acetic anhydride for 2 hours. The mixture is poured into 200 parts of water and neutralised by the addition of sodium carbonate. The oil which separates is dissolved in benzene, the benzene solution is separated from the aqueous layer, dried and the benzene evaporated. The residue is distilled under reduced pressure, the fraction boiling between 128° and 130° C. at a pressure of 0.08 millimetres of mercury being collected.

*Example 5*

13.8 parts of 4-nitroaniline are dissolved by warming in a mixture of 16 parts of water and 30 parts of a 10 N aqueous solution of hydrochloric acid. The solution is added to 250 parts of water and the suspension so formed is cooled to 0° C. and diazotised by adding a solution of 6.9 parts of sodium nitrite in 50 parts of water. After stirring for 15 minutes the diazo solution is filtered and added below 10° C. with stirring to a solution of 23.2 parts of N-methyl-N-(γ-cyano-β-acetoxypropyl)aniline in a mixture of 1000 parts of water, 50 parts of a 2 N aqueous solution of hydrochloric acid and 800 parts of acetone. 75 parts of a 4 N aqueous solution of sodium acetate are then added and after stirring at room temperature for 3 hours the dye which is precipitated is filtered off. The dye paste is stirred in 1000 parts of water and sodium carbonate is added until the mixture is neutral to litmus. The dyestuff is filtered off, washed with water and dried. When the 4-nitro-4'-[N-methyl-N-(γ-cyano - β - acetoxypropyl)amino]azobenzene so obtained is dispersed in water it dyes textile materials comprising polyester fibres in reddish orange shades possessing very good fastness to dry heat treatments and to light.

*Example 6*

In place of the solution of 19 parts of N-methyl-N-(γ-cyano-β-hydroxypropyl)aniline used in Example 1 there is used a solution of 23.2 parts of N-methyl-N-(γ-cyano-β-acetoxypropyl)aniline in a mixture of 1000 parts of water, 50 parts of a 2 N aqueous solution of hydrochloric acid and 800 parts of acetone. When the 4-nitro-2-carbomethoxy-4'-[N-methyl-N - (γ-cyano - β - acetoxypropyl)-amino]azobenzene so obtained is dispersed in aqueous medium it dyes textile materials comprising polyester fibres in red shades possessing good fastness to dry heat treatments and to light.

*Example 7*

7.25 parts of sodium nitrite are added with stirring to 75 parts of sulphuric acid of 100% strength the temperature being kept at between 20° and 27° C. by a cooling bath. The solution is stirred for 30 minutes at this temperature and 16.3 parts of 2-amino-5-nitrobenzonitrile are then added during 1 hour, the temperature being maintained at between 20° and 25° C. The mixture is then stirred for 2 hours at this temperature and added to a mixture of 500 parts of ice and 125 parts of water. The solution is filtered and added with stirring at between 5° and 10° C. to a solution of 23.2 parts of N-methyl-N-(γ-cyano-β-acetoxypropyl)aniline in a mixture of 1000 parts of water, 50 parts of a 2 N aqueous solution of hydrochloric acid and 800 parts of acetone. 140 parts of sodium acetate crystals and 600 parts of water are then added, the mixture is stirred for 1 hour and the precipitated dye is filtered off. The dyestuff paste is stirred with 1000 parts of water and sodium carbonate is added until the mixture is neutral to litmus. The dyestuff is then re-filtered, washed with water and dried. When the 4-nitro-2-cyano-4'-[N-methyl - N - (γ-cyano-β-acetoxypropyl)amino]azobenzene so obtained is dispersed in water it dyes textile materials comprising polyester fibres in bluish red shades possessing very good fastness to dry heat treatments and good fastness to light.

*Example 8*

In place of the solution of 19 parts of N-methyl-N-(γ-cyano-β-hydroxypropyl)aniline in Example 1 there is used a solution of 23.2 parts of N-methyl-N-(γ-cyano-β-acetoxypropyl)aniline in a mixture of 1000 parts of water, 50 parts of a 2 N aqueous solution of hydrochloric acid and 800 parts of acetone; and in place of 19.6 parts of methyl 2-amino - 5 - nitrobenzoate there are used 15.25 parts of 2-chloro-4-cyanoaniline. When the 2-chloro-4-cyano-4'-[N-methyl-N-(γ-cyano-β-acetoxypropyl)amino]-azobenzene so obtained is dispersed in water it dyes textile materials comprising polyester fibres in bright orange shades possessing good fastness to dry heat treatments and to light.

*Example 9*

In place of the solution of 19 parts of N-methyl-N-(γ-cyano-β-hydroxypropyl)aniline used in Example 3 there is used a solution of 23.2 parts of N-methyl-N-(γ-cyano-β-acetoxypropyl)aniline in a mixture of 1000 parts of water, 50 parts of a 2 N aqueous solution of hydrochloric acid and 800 parts of acetone. When the 4-(6'-thiocyanobenzthiaz-2'-ylazo) - N - methyl - N - (γ-cyano-β-acetoxypropyl)aniline so obtained is dispersed in water it dyes textile materials comprising polyester fibres in red shades of very good fastness to dry heat treatments.

*Example 10*

In place of 20.7 parts of 2-amino-6-thiocyanobenzthiazole used in Example 3 there are used 22.8 parts of 2-amino-6-methanesulphonylbenzthiazole and in place of the solution of 19 parts of N-methyl-N-(γ-cyano-β-hydroxypropyl)aniline there is used a solution of 23.2 parts of N-methyl-N-(γ-cyano - β - acetoxypropyl)aniline in a mixture of 1000 parts of water, 50 parts of a 2 N aqueous solution of hydrochloric acid and 800 parts of acetone. When the 4-(6'-methylsulphonylbenzthiaz-2'-ylazo) - N - methyl-N-(γ-cyano-β-acetoxypropyl)aniline so obtained is dispersed in aqueous medium it dyes textile materials comprising polyester fibres in red shades possessing good fastness to dry heat treatments. Red shades are also obtained on cellulose acetate and triacetate.

The following table gives further examples of the shades obtained on polyester ester textile material by dyeing with the dyestuffs obtained by coupling the diazotised amines of column 2 with the coupling components of column 3 according to the procedure of Example 1.

| Example | Amine | Coupling Component | Shade on Polyester Textile Material |
|---|---|---|---|
| 11 | 2-chloro-4-nitroaniline | N-methyl-N-(γ-cyano-β-hydroxypropyl)aniline. | red. |
| 12 | 2:6-dichloro-4-nitroaniline. | N-methyl-N(γ-cyano-β-acetoxypropyl)aniline. | brownish red. |
| 13 | p-nitroaniline | N:N-di-(γ-cyano-β-hydroxypropyl-m-toluidine. | reddish orange. |
| 14 | ___do___ | N-β-acetoxyethyl-N-(γ-cyano-β-acetoxypropyl)aniline. | orange. |
| 15 | methyl 2-amino-5-nitrobenzoate. | N:N-di-(γ-cyano-β-hydroxypropyl)-m-toluidine. | reddish orange. |
| 16 | p-nitroaniline | N:N-di-(γ-cyano-β-acetoxypropyl)-m-toluidine. | orange. |
| 17 | ___do___ | N-β-methoxyethyl-N-(γ-cyano-β-hydroxypropyl)-m-toluidine. | red. |
| 18 | 3-chloro-4-aminophenylmethylsulphone. | N:N-di-(γ-cyano-β-acetoxypropyl)-m-toluidine. | orange. |
| 19 | ___do___ | N-ethyl-N-(γ-cyano-β-benzoyloxypropyl)aniline. | Do. |
| 20 | 2:5-bismethylsulphonyl aniline. | N-methyl-N-(γ-cyano-β-hydroxypropyl)-m-chloroaniline. | Do. |
| 21 | α-naphthylamine | N-methyl-N-γ-cyano-β-acetoxypropylaniline. | red. |

The following table gives further examples of the shades obtained on polyester textile material by dyeing with the dyestuffs obtained by coupling the diazotised amines of column 2 with the coupling components of column 3 according to the procedure of Example 3.

| Example | Amine | Coupling Component | Shade on Polyester Textile Material |
|---------|-------|--------------------|--------------------------------------|
| 22 | 2-amino-6-thiocyano-benzthiazole. | N-β-hydroxyethyl-N-(γ-cyano-β-hydroxypropyl) aniline. | red. |
| 23 | ----do---- | N-ethyl-N-(γ-cyano-β-hydroxypropyl)-m-toluidine. | bluish red. |
| 24 | 2-amino-5-nitrothiazole. | N-methyl-N-(γ-cyano-β-acetoxypropyl)-m-chloroaniline. | violet. |

*Example 25*

11.7 parts of acetyl chloride are added at a temperature of between 5° and 10° C. to a solution of 38.3 parts of the dyestuff of Example 17 in 200 parts of pyridine. The reaction mixture is stirred for 1 hour at atmospheric temperature and then poured into 6000 parts of water. After stirring for a further 16 hours the precipitated dye is filtered off. The 4-nitro-4'-[N-β-methoxyethyl-N-(γ-cyano-β-acetoxypropyl)amino]azobenzene so obtained, when dispersed in water by milling with disodium dinaphthylmethane di-β-sulphonate, dyes textile materials comprising polyester fibres in scarlet shades possessing good fastness to dry heat treatments.

*Example 26*

If in place of the 11.7 parts of acetylchloride in Example 25 there are used 16.0 parts of n-butyryl chloride and in place of 38.3 parts of the dyestuff of Example 17 there are used 43.6 parts of the dyestuff of Example 23 the dye obtained is 3-methyl-4-(6'-thiocyanobenzthiaz-2'-ylazo)-N-ethyl N-(γ-cyano-β-butyryloxypropyl)aniline which dyes polyester textile material in bluish red shades possessing good fastness to dry heat treatments.

*Example 27*

If in Example 25 the 11.7 parts of acetyl chloride are replaced by 13.9 parts of propionyl chloride and the 38.3 parts of the dyestuff of Example 17 are replaced by 43.6 parts of the dyestuff of Example 23, 3-methyl-4(6'-thiocyanobenzthiaz-2'-ylazo)-N-ethyl-N-(γ-cyano-β - propionyloxypropyl)aniline is obtained. This product, when dispersed in water by milling with disodium dinaphthyl-methane di-β-sulphonate, dyes textile materials comprising polyester fibres in bluish red shades possessing good fastness to dry heat treatments.

What we claim is:

1. Monoazo dyestuffs of the formula:

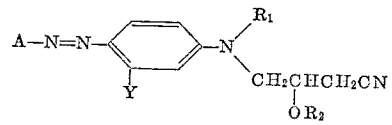

A represents an aryl radical selected from the group consisting of phenyl, α-naphthyl, β-naphthyl, nitrothiazol-2-yl, thiocyanobenzthiazol-2-yl and methylsulphonylbenzthiazol-2-yl, and any substituents on a phenyl radical represented by A are selected from the group consisting of chlorine, nitro, cyano, carbalkoxy and alkylsulphonyl, Y is selected from the group consisting of hydrogen, chlorine, bromine, methyl, alkoxy and acetamido, $R_1$ is selected from the group consisting of radicals of the formula

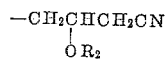

and alkyl radicals of from 1 to 4 carbon atoms on which any substituents are selected from the group consisting of hydroxy, acetoxy and methoxy radicals, and $R_2$ is selected from the group consisting of hydrogen, alkoyl radicals of from 2 to 4 carbon atoms and benzoyl, p-toluyl and p-methoxybenzoyl radicals.

2. 2-chloro-4-nitro-4'-[N-methyl-N-(γ-cyano-β-acetoxypropyl)amino]azobenzene.

3. 4-nitro-2-carbomethoxy-4'-[N-methyl-N-(γ-cyano-β-acetoxypropyl)amino]azobenzene.

4. 4-nitro-4'-[N-β-acetoxyethyl-N-(γ-cyano-β-acetoxypropyl)amino]azobenzene.

5. 2-chloro-2'-methyl-4-methylsulphonyl-4'-[N:N-di(γ-cyano-β-acetoxypropyl)amino]azobenzene.

6. 2-chloro-4-methylsulphonyl-4'-[N-ethyl-N-(γ-cyano-β-benzoyloxypropyl)amino]azobenzene.

References Cited in the file of this patent

UNITED STATES PATENTS 2,173,417   Huber et al.   Sept. 19, 1939
2,206,885   Dickey   July 9, 1940